United States Patent Office 3,247,198
Patented Apr. 19, 1966

3,247,198
PROCESS FOR MAKING ORGANIC DERIVATIVES OF PYROPHOSPHORIC AND HYPOPHOSPHORIC ACIDS
Jean-Marie Cheymol, Pierre Eugène Chabrier de Lassauniere, and Mohamed Selim, all of Paris, France, assignors to Pechiney-Progil Society for the Development and Sale of Chemical Specialties, Paris, France
No Drawing. Filed Aug. 7, 1961, Ser. No. 129,546
Claims priority, application France, Aug. 8, 1960, 835,333; July 11, 1961, 867,610
3 Claims. (Cl. 260—246)

This invention relates to tetra-substituted organic derivatives of pyrophosphoric and hypophosphoric acids and to methods of making same.

It is known that organic pyrophosphates bearing four identical substituents can be prepared by reacting an organic di-substituted derivative of chlorophosphoric acid with a sodium or silver salt of organic di-substituted derivatives of orthophosphoric acid at ordinary temperature or by reacting a sodium or silver salt of an organic di-substituted derivative of orthophosphoric acid with a monoester of a similar di-substituted derivative at higher temperature. The di-substituted derivatives of orthophosphoric acid are in most cases obtained by mild hydrolysis of the halogen derivative

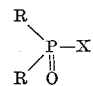

or of a tri-substituted derivative. In other respects, the second method, as defined above, is not commercial. It necessitates the use of temperatures of the order of 130–140° C. which limits the field of application and moreover leads to impure products which are difficult to separate.

In United States Patent No. 2,503,204, description is made of a method of making a tetraethyl pyrophosphate in which chlorine is reacted with the products resulting from the reaction of diethyl chlorophosphate and sodium diethylphosphite.

It is also known to prepare organic tetra-substituted derivatives, having identical substituents, of hypophosphoric acid either by the action of diethylchlorophosphites on sodium diethylphosphate, or by the action of bromine on a suspension of sodium diethyl- or dipropylphosphite in ligroin. The yields provided by such methods are low and not of commercial value.

It is an object of this invention to provide an efficient and economical process for making organic tetra-substituted derivatives of pyrophosphoric and hypophosphoric acids of high purity grade and it is a related object to produce compounds of the type described from orthophosphoric and phosphite compounds.

It is another object of this invention to produce and to provide a method of producing pyrophosphate and hypophosphate compounds of the type described having a large choice of substituents bound to the phosphorus atom, and to obtain substances in a relatively purified state or which are easy to purify, and it is a related object to prepare a family of compounds which result from the great number of combinations which can be obtained wherein the more that the substituents are varied, the higher is the number of such combinations.

Other objects of this invention will hereinafter be set forth in the following descriptions.

In the process for making organic tetrasubstituted compounds of an acid of the group constituted by the pyrophosphoric and hypophosphoric acids in accordance with the practice of this invention, tetramethyl ammonium salt of an organic di-substituted derivative of orthophosphoric acid is reacted with a halogenated organic di-substituted derivative of an acid of the group consisting of orthophosphoric and phosphorous acids.

More specifically, the invention comprises the preparation of tetra-substituted organic pyrophosphates represented by the Formula 1 or hypophosphates represented by Formulae 2 or 3, as hereinafter set forth, as well as their eventual isomers:

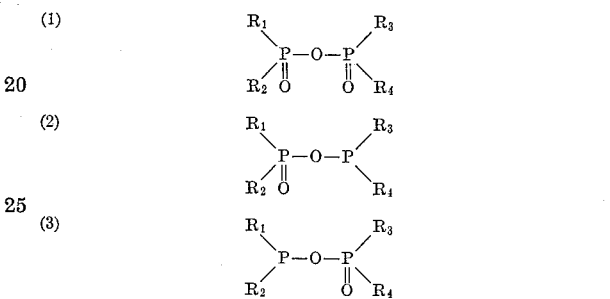

wherein each of the substituents $R_1$, $R_2$, $R_3$ and $R_4$ pertain to the group of saturated or unsaturated, substituted or unsubstituted, aliphatic, cyclic, aromatic and heterocyclic groups or radicals of mono-alcohols which may be saturated or unsaturated, halogenated and/or nitrated and belonging to the aliphatic, cyclic and/or heterocyclic series; or of substituted or unsubstituted mono-phenols, and/or of aliphatic, aromatic, cyclic and/or heterocyclic amines.

In accordance with the practice of this invention, the pyrophosphate of Formula 1 can be obtained by the reaction of tetramethylammonium salt of an organic di-substituted derivative of orthophosphoric acid upon an organic di-substituted derivative of a halogeno orthophosphoric acid.

The hypophosphate of Formulae 2 and 3 can be obtained by the reaction of tetramethyl ammonium salt of an organic di-substituted orthophosphoric acid with a di-substituted derivative of a halogeno phosphorous acid.

For example, in order to prepare pyrophosphates in which $R_1$, $R_2$ and $R_3$ or any other three substituents are identical, the following type of components are made to react one with another:

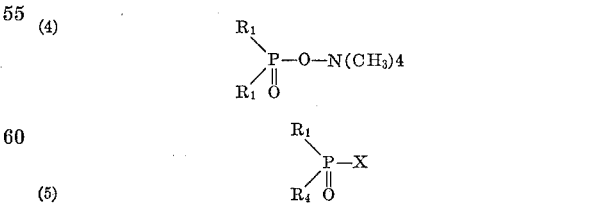

where X represents a halogen atom.

An analogous method is employed for the preparation of the two series of hypophosphates in which $R_1$, $R_2$ and $R_3$ are identical substituents. In such instance, the component of Formula 4 is brought into reaction with the component of formula:

(6) 

According to the nature of the substituents of the reacting components, it is also possible in accordance with the practice of this invention to produce organic tetrasubstituted derivatives of pyrophosphoric and hypophosphoric acids wherein at least any two substituents are different from one another. It is also well understood that it is possible to obtain a mixture of the derivatives of the Formulae 1, 2 and/or 3 in a single preparation, depending, of course, on the choice of appropriate reacting components.

The invention includes, as a composition of matter, the pyrophosphates and the hypophosphates represented respectively by the Formulae 1, 2 and/or 3 as well as their eventual isomers, and in particular those in which at least one of the four substituents $R_1$, $R_2$, $R_3$ and $R_4$ is different from the other three.

In accordance with the practice of this invention, preparation of said pyrophosphates and hypophosphates is preferably carried out by reaction of the described components with stirring, at about ambient temperature, and in the presence of an organic substance which is inert in respect to the phosphate reacting components. The reaction is carried out for a length of time which varies with the nature of said reacting components but which, in most instances, is in the order of a few hours or less. The reacting components are generally employed in about equal molecular proportions. However, a slight excess of one over the other may be provided. It will be understood that while it is preferred to carry out the reaction at about room temperature, elevated temperatures can be employed with corresponding acceleration of the reaction rate.

The inert organic substance is preferably one in which a reaction product such as tetramethyl ammonium chloride is insoluble. Representative are aromatic hydrocarbons, such as benzene or toluene, ethers such as diethylether or dioxane.

Once the reaction is completed, the tetramethyl ammonium chloride which separates is removed as by filtration. The inert organic substance is evaporated and the residue is purified by any conventional means, such for example as by distillation, preferably in vacuum, if the tetrasubstituted derivative is distillable, or else by recrystallization if it is solid at about room temperature.

The tetramethyl ammonium salts, used as one of the reactants, can be prepared in accordance with the teaching of the French patent No. 1,239,989, or by the copending French application No. 811,533.

The following examples, which bear no limitation on the scope of the invention, are given by way of illustration of the great variety of pyrophosphoric and hypophosphoric acid derivatives which can be prepared by the process of this invention:

A. Compounds of Formulae 1, 2 or 3 wherein all four substituents are identical:

EXAMPLE 1.—PREPARATION OF TETRAETHYL PYROPHOSPHATE 227 parts by weight of tetramethyl ammonium diethyl-phosphate are introduced into a reaction vessel followed by the addition of 1135 parts by weight of benzene. 173 parts by weight of diethyl chlorophosphate, dissolved in 865 parts by weight of benzene, are then added. The mixture is stirred for several hours at about room temperature.

The end point of the reaction can be determined by taking a sample of the solid which is in suspension to determine its melting point since tetramethyl ammonium chloride melts at 420° C. When the reaction is ended, the tetramethyl ammonium chloride is eliminated by filtration, leaving the tetraethyl pyrophosphate in benzene solution. The benzene is removed by distillation and the resulting ester is purified by distillation under reduced pressure.

The boiling point of the tetraethyl pyrophosphate under 0.03 mm. of Hg is 110° C. and the yield is 65%.

EXAMPLE 2.—PREPARATION OF TETRAMETHYL PYROPHOSPHATE

By proceeding as in Example 1, and by replacing in equimolecular proportions the tetramethyl ammonium salt of diethyl phosphate by tetramethyl ammonium salt of dimethyl phosphate and by replacing the diethyl chlorophosphate with dimethyl chlorophosphate, the corresponding tetramethyl pyrophosphate is produced as a product.

The boiling point of the tetramethyl pyrophosphate is 105° C. under 0.05 mm. of Hg.

EXAMPLE 3.—PREPARATION OF TETRA-N-BUTYL PYROPHOSPHATE

By proceeding as in Example 1 and by replacing in equimolecular proportions the tetramethyl ammonium salt of diethyl phosphate by the tetramethyl ammonium salt of di-n-butyl phosphate and by replacing the diethyl chlorophosphate by di-n-butyl phosphate, the tetra-n-butyl pyrophosphate is secured as a product.

The boiling point of the tetra-n-butyl pyrophosphate is 115° C. under 0.01 mm. of Hg.

In Examples 2 and 3, yields in the order of 60% have been secured.

EXAMPLE 4.—PREPARATION OF TETRAETHYL HYPOPHOSPHATE 1 gram mole of tetramethyl ammonium diethyl phosphate is introduced into a reaction vessel with 1000 cc. benzene. This is followed by the addition of 1 gram mole of diethyl chlorophosphite. The diethyl chlorophosphite is prepared by direct reaction of one gram mole of phosphorous trichloride with 2 gram moles of anhydrous ethanol in benzene solution, and in the presence of 2 gram moles of a hydrogen halide acceptor, such as sodium ethylate, pyridine, lutidine or triethylamine.

The phosphate-phosphite mixture is vigorously stirred at room temperature for about three hours. The tetramethyl ammonium chloride which separates is removed by filtration and the tetraethyl hypophosphate remains in solution in benzene. The benzene is separated by distillation and the hypophosphate is then distilled at 110° C. under 0.5 mm. of Hg.

A yield of about 70% is obtained.

B. Compounds of Formulae 1, 2 or 3 wherein three of the substituents are identical:

EXAMPLE 5.—PREPARATION OF O,O-DIMETHYL-O-METHYL N,N-DIMETHYLAMIDO PYROPHOSPHATE

Tetramethyl ammonium dimethyl phosphate and O-methyl, N,N-dimethylamido chlorophosphate are reacted in equimolecular proportions in accordance with the procedure set forth in Example 1. The resulting pyrophosphate as defined above is produced in about a 40% yield and distills at 115° C. under 0.01 mm. of Hg.

EXAMPLES 6 TO 8

In the following Table 1, there are listed the substituents of pyrophosphate prepared by the technique of Example 1, in which the reaction components $R_1$, $R_2$, $R_3$ correspond to $R_1$ in Equations 4 and 5 and $R_4$ corresponds to $R_4$ in Equation 5:

Table 1

| $R_1=R_2=R_3$ | $R_4$ | Boiling points, °C./mm. Hg | Yields, percent |
|---|---|---|---|
| $CH_3O-$ | $(C_2H_5)_2N-$ | 112/0.01 | 35 |
| $CH_3O-$ | O⟨⟩N— (morpholino) | 110/0.03 | 40 |
| $CH_3O-$ | ⟨⟩N— (piperidino) | 115/0.05 | 40 |

EXAMPLE 9.—PREPARATION OF METHYLETHYL DIETHYL HYPOPHOSPHATE

Under the same conditions as in Example 4, diethyl chlorophosphite is reacted with tetramethyl ammonium methylethyl phosphate to produce methylethyl diethyl hypophosphate having the following formula:

$$\begin{array}{c} H_3CO \\ H_5CO_2 \end{array} P-O-P \begin{array}{c} OC_2H_5 \\ OC_2H_5 \end{array}$$

The compound distills at about 86° C. under 0.01 mm. of Hg and the product is secured in about 80% yield.

C. Compounds of Formulae 1, 2 or 3 wherein $R_1$ and $R_2$ are identical substituents and $R_3$ and $R_4$ are identical but different from the substituents of $R_1$ and $R_2$:

EXAMPLE 10.—PREPARATION OF DIMETHYL DIETHYL PYROPHOSPHATE

Following the conditions as set forth in Example 1 and by replacing in equimolecular proportions, either diethylchlorophosphate by dimethyl chlorophosphate, or tetramethyl ammonium diethyl phosphate by tetramethyl ammonium dimethylphosphate, a yield of about 55% of dimethyl diethyl pyrophosphate is obtained.

The product has a distillation point of 110° C. under 0.1 mm. of Hg.

EXAMPLE 11.—PREPARATION OF DIMETHYL DI-n-BUTYL PYROPHOSPHATE

By following the reaction conditions as set forth in Example 1, and by using as the reactants di-n-butyl chlorophosphate with tetramethyl ammonium dimethylphosphate in equimolecular proportions, a product of dimethyl di-n-butyl pyrophosphate is obtained after distillation at 115° C. under 0.05 mm. of Hg. A yield of about 50% is obtained.

EXAMPLES 12 TO 14.—PREPARATION OF O,O-DIETHYL DI-TERTIOAMIDO PYROPHOSPHATES

By reacting equimolecular proportions of diethylchlorophosphate with tetramethyl ammonium salt of bis-dimethyl amidophosphate or with tetramethyl ammonium salt of di-morpholinophosphate or tetramethyl ammonium salt of di-piperidinophosphate, in accordance with the procedures of Example 1, O,O-diethyl di-tertioamido pyrophosphate structures are obtained as set forth in the following table:

Table 2

| $R_1=R_2$ | $R_3=R_4$ | Boiling Point, °C./mm. Hg | Yield, percent |
|---|---|---|---|
| $C_2H_5O-$ | $(CH_3)_2N-$ | 120/0.05 | 40 |
| $C_2H_5O-$ | O⟨⟩N— | 122/0.01 | 40 |
| $C_2H_5O-$ | ⟨⟩N— | 122/0.01 | 40 |

EXAMPLE 15.—PREPARATION OF DIMETHYL DIETHYL HYPOPHOSPHATE

By proceeding in the same manner as in Example 4, tetramethyl ammonium dimethyl phosphate is reacted with an equimolecular proportion of diethyl chlorophosphite. The product dimethyl diethyl hypophosphate is produced with a 70% yield. The product distills at 100° C. under 0.5 mm. of Hg.

EXAMPLES 16 TO 22

In the same procedure as set forth in Example 4, the following table sets out the structure of hypophosphates which are prepared in accordance with the practice of this invention by using the corresponding tetramethyl ammonium disubstituted phosphate and the corresponding dialkyl chlorophosphite in accordance with the following equation:

$$\begin{array}{c} R_1 \\ R_2 \end{array} \underset{O}{\overset{\|}{P}}-ON(CH_3)_4 + \begin{array}{c} R_3 \\ R_4 \end{array} P-X \longrightarrow \begin{array}{c} R_1 \\ R_2 \end{array} \underset{O}{\overset{\|}{P}}-O-P \begin{array}{c} R_3 \\ R_4 \end{array}$$

Table 3

| $R_1=R_2$ | $R_3=R_4$ | Boiling point, °C./mm. Hg | Yield, percent |
|---|---|---|---|
| $C_3H_7O-$ | $C_2H_5O-$ | 115/0.3 | 70 |
| $C_4H_9O-$ | $C_2H_5O-$ | 120/0.3 | 70 |
| $C_6H_5O-$ | $C_2H_5O-$ | 125/0.1 | 50 |
| $C_6H_5CH_2O-$ | $C_2H_5O-$ | 140/0.01 | ——— |
| $(CH_3)_2N-$ | $C_2H_5O-$ | 109/0.02 | 50 |
| O⟨⟩N— | $C_2H_5O-$ | 130/0.01 | 50 |
| ⟨⟩N— | $C_2H_5O-$ | 121/0.01 | 50 |

D. Compounds of Formulae 1, 2 or 3 wherein two substituents are different from one another and the other two are identical to one another but different than the first two substituents:

EXAMPLE 23.—PREPARATION OF METHYL-PROPARGYL DIETHYL PYROPHOSPHATE

By following the procedure in Example 1, using as the reactants diethyl chlorophosphate and tetramethyl ammonium propargyl methylphosphate, the compound methylpropargyl diethyl pyrophosphate having the following formula is produced in yields of about 60%:

$$\begin{array}{c} H_3CO \\ HC{\equiv}C-H_2CO \end{array} \underset{O}{\overset{\|}{P}}-O-P \underset{O}{\overset{\|}{\phantom{P}}} \begin{array}{c} OC_2H_5 \\ OC_2H_5 \end{array}$$

The product distills at 110° C. under 0.01 mm. of Hg.

EXAMPLE 24.—PREPARATION OF O,O-DIETHYL-O-METHYL N,N-DIMETHYLAMIDO PYROPHOSPHATE

Following the procedure as set forth in Example 1 by replacing the tetramethyl ammonium diethyl phosphate with tetramethyl ammonium O-methyl N,N-dimethylamido phosphate, the compound of Example 24 is obtained in a yield of about 55%. The compound distills at 110° C. under 0.01 mm. of Hg.

EXAMPLES 25 TO 27

By carrying out the procedure as in Example 1, pyrophosphates are prepared having the structure shown in the following table using the following as the reaction and ingredients:

$$\begin{array}{c} R_1 \\ R_2 \end{array} \underset{O}{\overset{\|}{P}}-ON(CH_3)_4 + \begin{array}{c} R_3 \\ R_4 \end{array} \underset{O}{\overset{\|}{P}}-X \longrightarrow \begin{array}{c} R_1 \\ R_2 \end{array} \underset{O}{\overset{\|}{P}}-O-P \underset{O}{\overset{\|}{\phantom{P}}} \begin{array}{c} R_3 \\ R_4 \end{array}$$

Table 4

| R₁ | R₂ | R₃ | R₄ | Boiling point, °C./mm. Hg | Yield, percent |
|---|---|---|---|---|---|
| $C_2H_5O-$ | $C_2H_5O-$ | $CH_3O-$ | $(CH_3)_2N-$ | 112/0.01 | 50 |
| $C_2H_5O-$ | $C_2H_5O-$ | $CH_3O-$ | 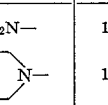 | 112/0.01 | 48 |
| $C_2H_5O-$ | $C_2H_5O-$ | $CH_3O-$ | 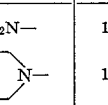 | 116/0.01 | 47 |

EXAMPLES 28 TO 39

By proceeding in accordance with the procedure in Example 4, the hypophosphates of the following structures are obtained using the corresponding tetramethyl ammonium salt of the di-substituted phosphate and the corresponding dialkyl chlorophosphite, as follows:

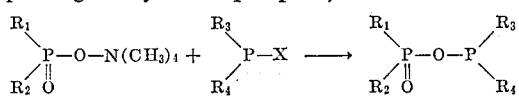

Table 5

| R₁ | R₂ | R₃ | R₄ | Boiling point, °C./mm. Hg | Yield, percent |
|---|---|---|---|---|---|
| $CH_3O-$ | $C_3H_7O-$ | $C_2H_5O-$ | $C_2H_5O-$ | 96/0.01 | 70 |
| $CH_3O-$ | $HC\equiv C-CH_2O-$ | $C_2H_5O-$ | $C_2H_5O-$ | 110/0.02 | 30–40 |
| $CH_3O-$ | $NO_2C_6H_4O-$ | $C_2H_5O-$ | $C_2H_5O-$ | 130/0.11 | 30–40 |
| $CH_3O-$ | 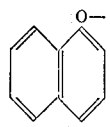 | $C_2H_5O-$ | $C_2H_5O-$ | 135/0.01 | 50 |
| $CH_3O-$ | 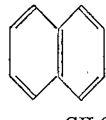 | $C_2H_5O-$ | $C_2H_5O-$ | 135/0.01 | 50 |
| $CH_3O-$ | 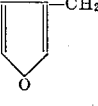 | $C_2H_5O-$ | $C_2H_5O-$ | 125/0.01 | 50 |
| $CH_3O-$ | $C_6H_5O-$ | $C_2H_5O-$ | $C_2H_5O-$ | 115/0.01 | 60 |
| $CH_3O-$ | $C_6H_5CH_2O-$ | $C_2H_5O-$ | $C_2H_5O-$ | 124/0.08 | 70 |
| $CH_3O-$ | $(CH_3)_2N-$ | $C_2H_5O-$ | $C_2H_5O-$ | 101/0.04 | 50 |
| $CH_3O-$ | $(C_2H_5)_2N-$ | $C_2H_5O-$ | $C_2H_5O-$ | 103/0.01 | 50 |
| $CH_3O-$ |  | $C_2H_5O-$ | $C_2H_5O-$ | 121/0.01 | 50 |
| $CH_3O-$ |  | $C_2H_5O-$ | $C_2H_5O-$ | 112/0.01 | 50 |

It will be understood that changes may be made in the details of formulation and procedures without departing from the spirit of the invention, especially as defined in the following claims.

We claim:
1. A process for making organic tetra-substituted compounds of an acid selected from the group consisting of pyrophosphoric and hypophosphoric acids comprising reacting a tetramethyl ammonium salt of an organic di-substituted derivative of orthophosphoric acid, with a halogen derivative of an organic di-substituted derivative of an acid selected from the group consisting of orthophosphoric and phosphorous acid.

2. A process for making unsymmetrical organic compounds of phosphoric acid having the formula

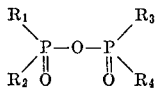

said process comprising reacting

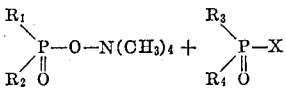

in which X is a halogen atom and $R_1$, $R_2$, $R_3$ and $R_4$ are radicals selected from the group consisting of hydrocarbonoxy, cycloheteroxy and amino and wherein at least one of the members $R_1$, $R_2$, $R_3$ and $R_4$ differs from the others.

3. A process for making unsymmetrical organic compounds of hypophosphoric acid having the formula

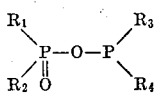

said process comprising reacting

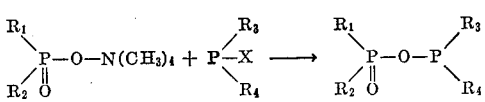

in which X is a halogen and $R_1$, $R_2$, $R_3$ and $R_4$ are radicals selected from the group consisting of hydrocarbonoxy, cycloheteroxy and amino, and wherein at least one of the members $R_1$, $R_2$, $R_3$ and $R_4$ differs from the others.

(References on following page)

References Cited by the Examiner

UNITED STATES PATENTS

| | | | |
|---|---|---|---|
| 2,502,966 | 4/1950 | Kosolapoff | 260—461 |
| 2,503,204 | 4/1950 | Kosolapoff | 260—461 |
| 2,634,226 | 4/1953 | Kosolopoff | 260—461 |
| 2,634,227 | 4/1953 | Kosolopoff | 260—461 |
| 2,668,179 | 2/1954 | Tolkmith | 260—461 |
| 2,683,733 | 7/1954 | Toy | 260—461 |
| 2,717,249 | 9/1955 | Toy et al. | 260—247.5 |
| 2,718,524 | 9/1955 | Lanham et al. | 260—461 |
| 2,729,667 | 1/1956 | Saul | 260—461 |
| 2,865,945 | 12/1958 | Kamlet | 260—461 |
| 2,868,827 | 1/1959 | O'Connor et al. | 260—461 |
| 2,977,383 | 3/1961 | Perkow | 260—461 |

FOREIGN PATENTS

| | | |
|---|---|---|
| 196,352 | 3/1958 | Austria. |
| 576,425 | 5/1959 | Canada. |

OTHER REFERENCES

Bandler: Zeitschrift für Anorganische und Allgemeine Chemie, volume 288, pages 171–189 (1956).

Chemical Abstracts, volume 52, columns 240e and 241a (1958); abstracted from an article by Nikonorov et al., Khim. i Primenenie Fosfororgan, Soedinenii, Akad. Nauk. S.S.S.R.; Trudy 1-oi Konferents (1955), pages 223–231 (published 1957).

NICHOLAS S. RIZZO, *Primary Examiner.*

IRVING MARCUS, *Examiner.*